(12) United States Patent
Morioke (10) Patent No.: US 8,531,086 B2
(45) Date of Patent: Sep. 10, 2013

(54) VIBRATION ACTUATOR, LENS BARREL, AND CAMERA

(75) Inventor: Toshikazu Morioke, Kawasaki (JP)

(73) Assignee: Nikon Corporation, Tokyo (JP)

( * ) Notice: Subject to any disclaimer, the term of this patent is extended or adjusted under 35 U.S.C. 154(b) by 458 days.

(21) Appl. No.: 12/749,752

(22) Filed: Mar. 30, 2010

(65) Prior Publication Data

US 2011/0001366 A1    Jan. 6, 2011

(30) Foreign Application Priority Data

Mar. 31, 2009   (JP) .................................. 2009-085325

(51) Int. Cl.
*H02N 2/00*   (2006.01)

(52) U.S. Cl.
USPC .................. 310/328; 310/323.04; 310/323.09

(58) Field of Classification Search
USPC ......................... 310/311, 323.01–323.19, 328
See application file for complete search history.

(56) References Cited

U.S. PATENT DOCUMENTS

| | | | |
|---|---|---|---|
| 4,562,374 A | 12/1985 | Sashida | |
| 5,134,333 A * | 7/1992 | Atsuta | ...................... 310/323.04 |
| 5,298,829 A * | 3/1994 | Tsukimoto et al. | ...... 310/323.04 |
| 5,300,850 A * | 4/1994 | Okumura et al. | ........ 310/323.04 |
| 5,432,394 A * | 7/1995 | Ohne | ........................ 310/323.04 |
| 5,682,805 A * | 11/1997 | Ohne | .............................. 83/875 |
| 5,831,370 A | 11/1998 | Sugaya | |
| 5,854,529 A | 12/1998 | Ashizawa et al. | |
| 5,949,178 A * | 9/1999 | Tamai et al. | ............. 310/323.01 |
| 6,674,217 B1 * | 1/2004 | Fujimoto | ................. 310/323.06 |
| 7,671,516 B2 | 3/2010 | Adachi et al. | |

FOREIGN PATENT DOCUMENTS

| | | |
|---|---|---|
| JP | B2-1-17354 | 3/1989 |
| JP | A-2001-037265 | 2/2001 |
| JP | A-2001-45774 | 2/2001 |
| JP | A-2003-111451 | 4/2003 |

OTHER PUBLICATIONS

May 14, 2013 Office Action issued in Japanese Patent Application No. 2009-085325 (with translation).

* cited by examiner

*Primary Examiner* — Thomas Dougherty
(74) *Attorney, Agent, or Firm* — Oliff & Berridge, PLC (57) ABSTRACT

A vibration actuator 10 comprises an elastic body 12 that generates vibration waves in accordance with driving of an element 13, and a relative movement member that is in pressure contact with the body 12 and is relatively moved with respect to the body 12 by the vibration waves. A plurality of groove 30*s* are formed at the relative movement member side of the body 12, and depths of the groove 30*s* in a direction orthogonal to a relative movement direction of the relative movement member vary along the relative movement direction of the relative movement member.

14 Claims, 7 Drawing Sheets

VIBRATION ACTUATOR, LENS BARREL, AND CAMERA

The present application claims priority under 35 U.S.C. §119 to Japanese Patent Application No. 2009-085325 filed on Mar. 31, 2010. The content of the application is incorporated herein by reference in its entirety.

BACKGROUND OF THE INVENTION

1. Field of the Invention

The present invention relates to a vibration actuator, and to a lens barrel and camera provided therewith.

2. Description of the Related Art

A vibration actuator utilizes expansion and contraction of a piezoelectric body to generate progressive oscillation waves at a driving surface of an elastic body, elliptical motions are produced at the driving surface by the progressive waves, and a moving element that is in pressure contact with wave peaks of the elliptical motions is driven (see Japanese Patent Application Publication No. H1-17354). This vibration actuator is characterized by having high torque even at low speeds of rotation. Therefore, when it is mounted in a driving device, there are advantages in that gears may be omitted, gear noise is eliminated, and positioning accuracy may be improved.

SUMMARY OF THE INVENTION

As digital cameras and lens barrels have become more compact in recent years, space in which to dispose oscillation actuators has become more limited. However, if a vibration actuator is made smaller overall to fit the space, because the diameter of a vibrating element becomes smaller, the generated torque tends to fall.

An object of the present invention is to provide a vibration actuator that can be disposed even in limited space and that has excellent driving characteristics, and a lens barrel and camera provided therewith.

The present invention solves the above problem with the following solution.

In order to achieve the object mentioned above, according to the first aspect of the present invention, there is provided a vibration actuator comprising: an elastic body that is provided contacting an electromechanical conversion element and generates vibration waves in accordance with driving of the electromechanical conversion element; and a relative movement member that is in pressure contact with the elastic body and is relatively moved with respect to the elastic body by the vibration waves, wherein a plurality of grooves are formed at the relative movement member side of the elastic body, and depths of the grooves in a direction orthogonal to a relative movement direction of the relative movement member vary along the relative movement direction of the relative movement member.

In order to achieve the object mentioned above, according to the second aspect of the present invention, there is provided a vibration actuator comprising: an elastic body that is provided contacting an electromechanical conversion element and generates vibration waves in accordance with driving of the electromechanical conversion element; and a relative movement member that is in pressure contact with the elastic body and is relatively moved with respect to the elastic body by the vibration waves, wherein the elastic body is provided with a toothcomb portion provided at the relative movement member side and a base portion provided at the electromechanical conversion element side, and thickness of the base portion in a direction orthogonal to a relative movement direction of the relative movement member varies along the relative movement direction of the relative movement member.

In order to achieve the object mentioned above, according to the third aspect of the present invention, there is provided a vibration actuator comprising: an elastic body that is provided contacting an electromechanical conversion element and generates vibration waves in accordance with driving of the electromechanical conversion element; and a relative movement member that is in pressure contact with the elastic body and is relatively moved with respect to the elastic body by the vibration waves, wherein the Young's modulus of the elastic body varies along a relative movement direction of the relative movement member.

In order to achieve the object mentioned above, according to the fourth aspect of the present invention, there is provided a vibration actuator comprising: an elastic body that is provided contacting an electromechanical conversion element and generates vibration waves in accordance with driving of the electromechanical conversion element; and a relative movement member that is in pressure contact with the elastic body and is relatively moved with respect to the elastic body by the vibration waves, wherein density of the elastic body varies along a relative movement direction of the relative movement member.

Thickness of the elastic member in a direction orthogonal to the relative movement direction of the relative movement member may be constant along the relative movement direction of the relative movement member.

Width of the elastic member in a direction orthogonal to the relative movement direction of the relative movement member may vary along the relative movement direction of the relative movement member.

A profile of the elastic body may be elliptical.

According to the present invention, a vibration actuator that can be disposed even in limited space and has excellent driving characteristics, and a lens barrel and camera provided therewith, may be provided.

BRIEF DESCRIPTION OF THE DRAWINGS

In the drawings attached.

DETAILED DESCRIPTION OF THE PREFERRED EMBODIMENT

Herebelow, a preferred embodiment of the present invention is described with reference to the attached drawings and suchlike. The following embodiment describes an ultrasonic motor as an example of the vibration actuator.

Figure 1:
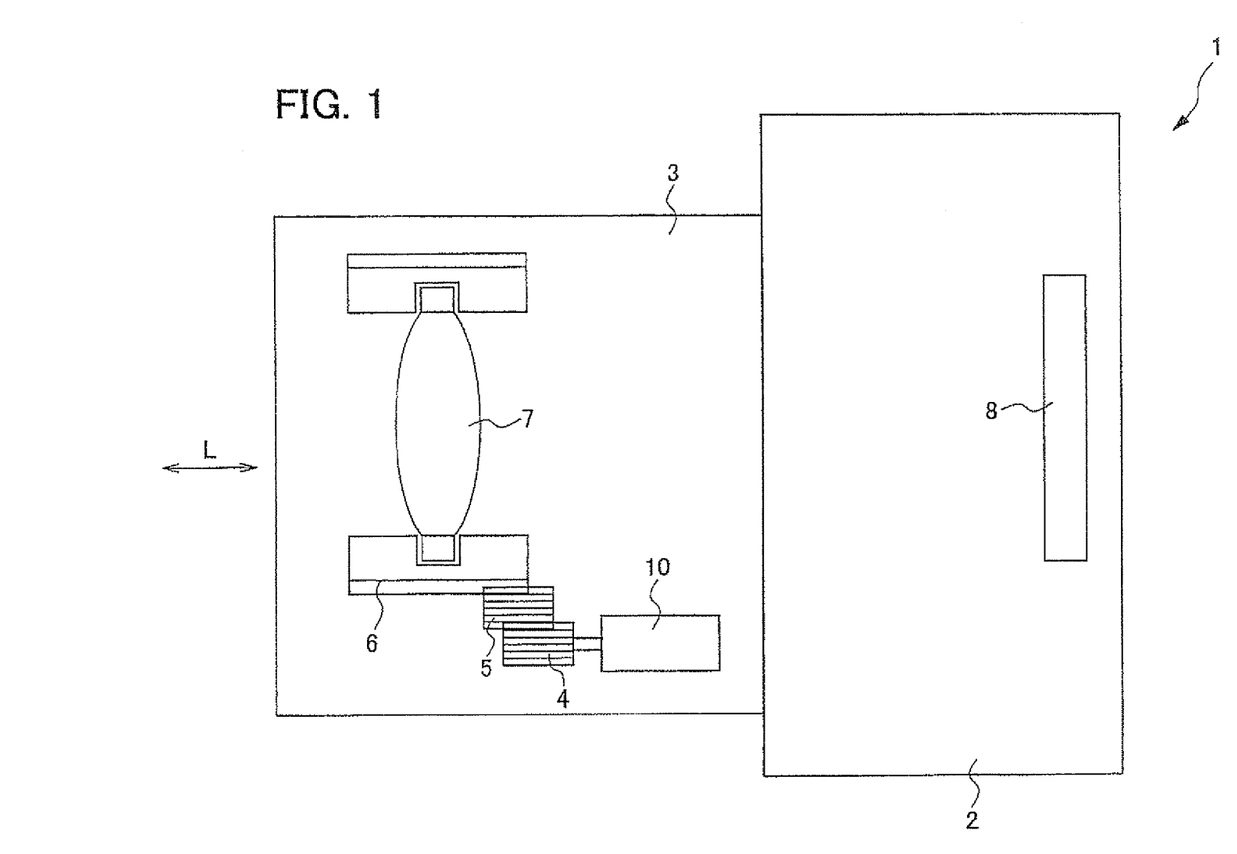
FIG. 1 is a diagram describing a camera of an embodiment of the present invention.
Figure 2:
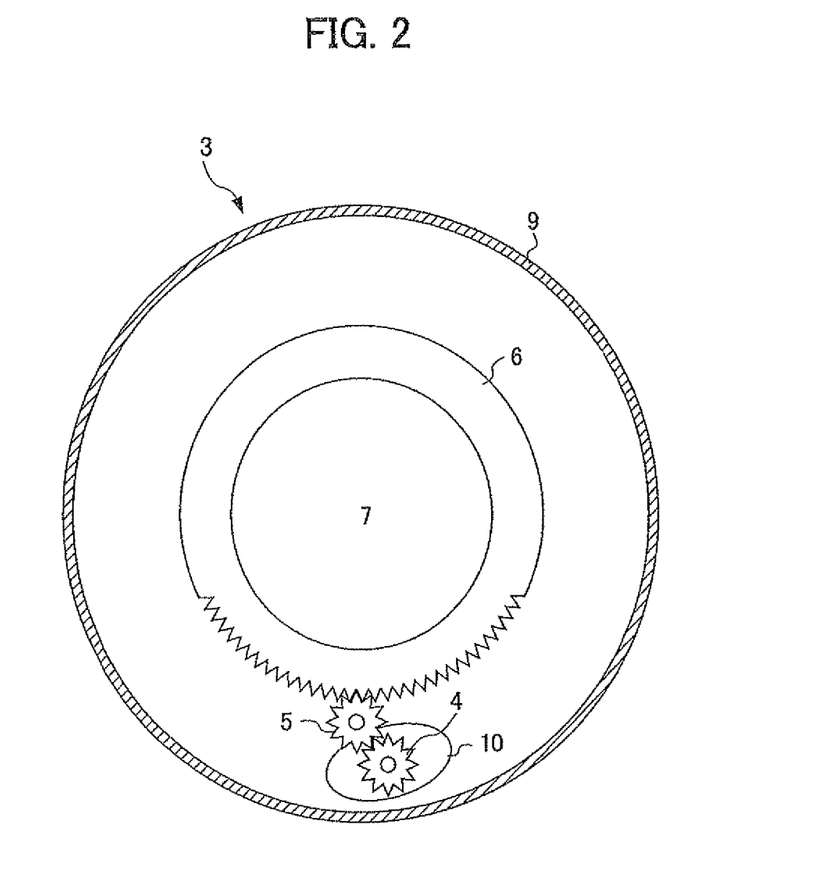
FIG. 2 is a diagram in which the interior of a lens barrel of a camera is viewed from the object side.

FIG. 1 is a diagram describing a camera 1 of an embodiment of the present invention. FIG. 2 is a diagram in which the interior of a lens barrel 3 of the camera 1 is viewed from the object side. The camera 1 is provided with a camera body 2 including an imaging device 8 and a lens barrel 3 including a lens 7. The lens barrel 3 is an interchangeable lens which is detachable from the camera body 2. In the present embodiment, an example is illustrated in which the lens barrel 3 is an interchangeable lens, but this is not to be limiting. For example, it may be a lens barrel of a type that is integral with the camera body.

The lens barrel 3 is provided with the lens 7, a cam tube 6, gears 4 and 5, an ultrasonic motor 10, a casing 9 enclosing these members, and so forth. In the present embodiment, the ultrasonic motor 10 is disposed in an annular gap between the cam tube 6 and the casing 9, as illustrated in FIG. 2. The ultrasonic motor 10 is used as a drive source that drives the lens 7 during focus-driving of the camera 1. The driving force provided from the ultrasonic motor 10 is transmitted to the cam tube 6 via the gears 4 and 5. The lens 7 is retained in the cam tube 6. The lens 7 is a focusing lens that is moved substantially parallel to an optical axis direction (the direction of arrow L shown in FIG. 1) by the driving force of the ultrasonic motor 10 to adjust the focus point.

In FIG. 1, an image of an object is focused at an imaging plane of the imaging device 8 by an unillustrated lens unit (including the lens 7) provided inside the lens barrel 3. The focused object image is converted to electronic signals by the imaging device 8, and these signals are A/D-converted. Thus, image data is obtained.

Figure 3:
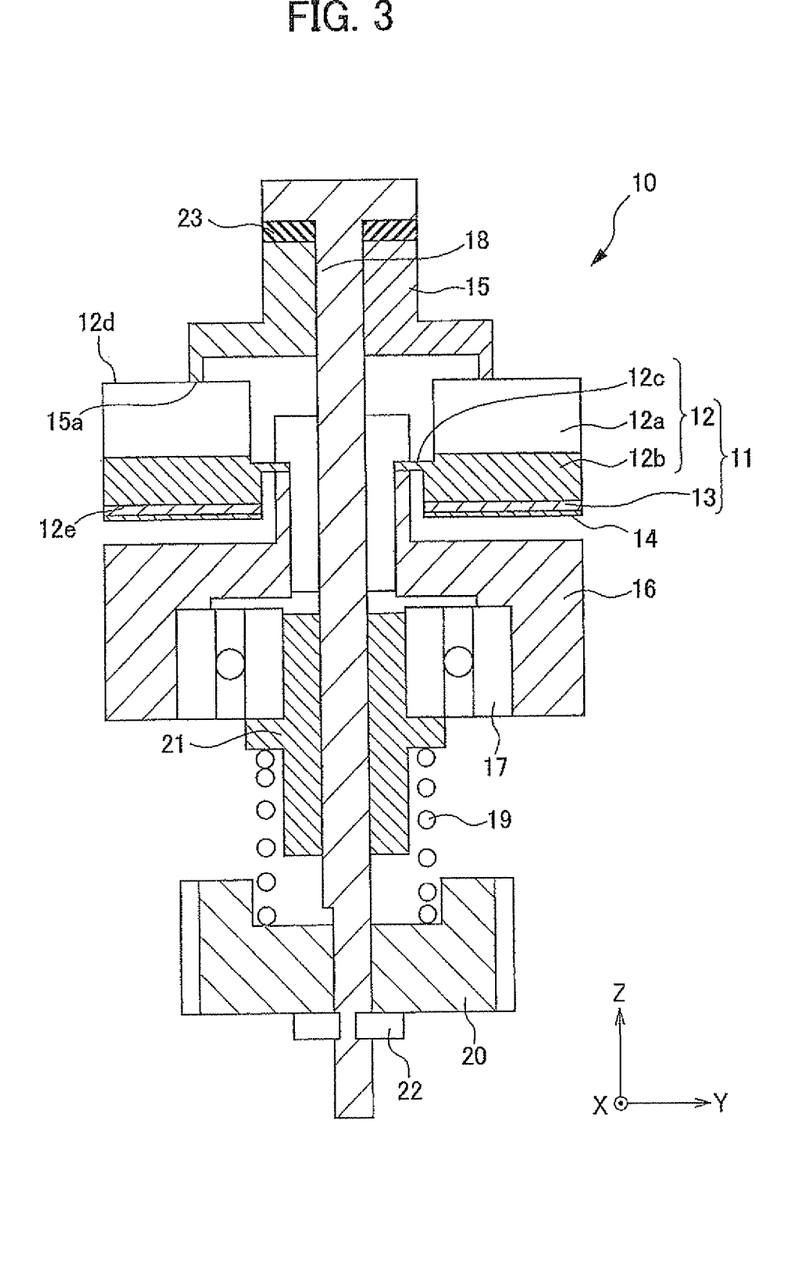
FIG. 3 is a cross-sectional diagram of an ultrasonic motor of the embodiment.
Figure 4A:
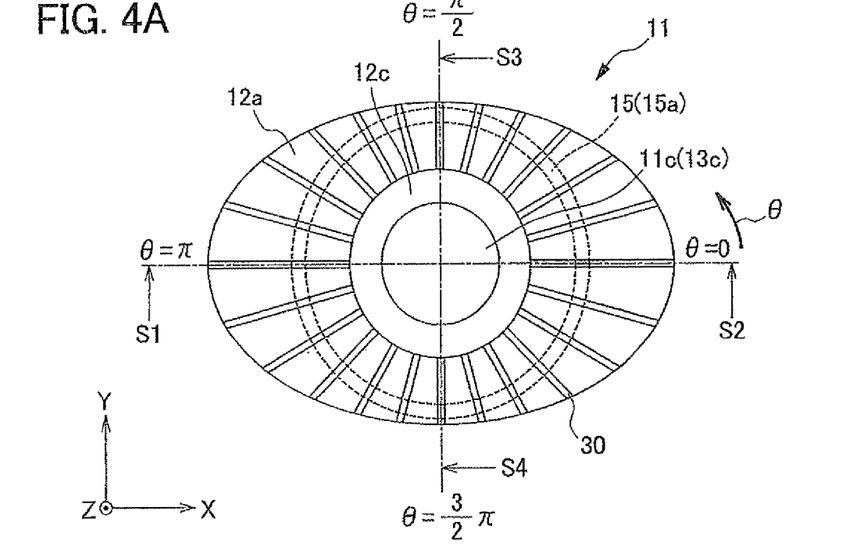
FIG. 4A is a diagram in which the vibrating element 11 is seen from the moving element 15 side thereof.
Figure 4B:
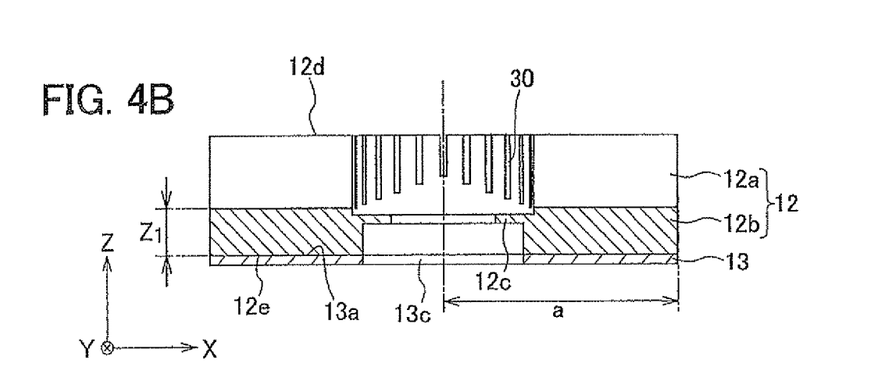
FIG. 4B is a cross-sectional diagram of the vibrating element 11 cut along the cross-section of arrows S1-S2, parallel to the XZ plane.
Figure 4C:
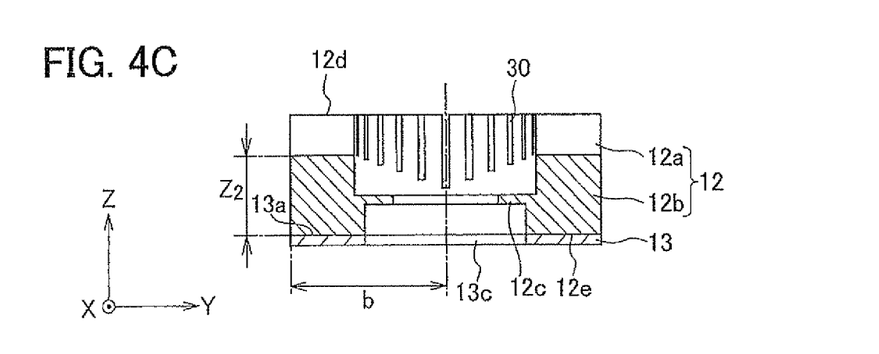
FIG. 4C is a cross-sectional diagram of the vibrating element 11 cut along the cross-section of arrows S3-S4, parallel to the YZ plane.

FIG. 3 is a cross-sectional diagram of the ultrasonic motor 10 of a first embodiment. An XYZ orthogonal co-ordinate system is established for ease of understanding in FIG. 3 and FIG. 4. FIG. 4 is described later. A direction parallel to an axial direction of an output shaft 18 is the Z-axis direction and, in the Z-axis direction, the direction toward a moving element 15 is the +Z direction. An outer profile of a vibrating element 11 as seen from the +Z direction (the moving element 15 side) has an elliptical shape. A direction parallel to the major axis of the elliptical shape (see the major axis in FIG. 4) is the X-axis direction, and a direction parallel to the minor axis (see the minor axis in FIG. 4) is the Y-axis direction.

The ultrasonic motor 10 of the first embodiment is provided with the vibrating element 11, the moving element 15, the output shaft 18, a pressing member 19 and so forth. In the ultrasonic motor 10, the vibrating element 11 side thereof is fixed and the moving element 15 is rotatingly driven. The vibrating element 11 is a member with a hollow shape, including an elastic body 12 and a piezoelectric body 13 that is joined to the elastic body 12. The elastic body 12 is a member that is formed of a metallic material with a large resonance peak sharpness. The elastic body 12 is a hollow shape whose profile is substantially elliptical (see FIG. 4A). This elastic body 12 includes a combtooth portion 12a, a base portion 12b, a flange portion 12c, and the like.

At the combtooth portion 12a, a plural number of grooves 30 are formed by cutting into the face at the side thereof that contacts the moving element 15. Distal end faces of the combtooth portion 12a is in pressure contact with the moving element 15, and form a driving surface 12d that drives the moving element 15. A lubricating surface treatment is applied to this driving surface, such as Ni—P (nickel-phosphorus) plating or the like. The reason for providing the combtooth portion 12a is to bring a neutral plane of progressive waves, which are produced at the driving surface 12d by expansion and contraction of the piezoelectric body 13, as close as possible to the piezoelectric body 13 side, thus amplifying the amplitudes of the progressive waves at the driving surface 12d.

The base portion 12b is a portion that is continuous in the circumferential direction of the elastic body 12. The piezoelectric body 13 is joined to a face of the base portion 12b at the opposite side thereof from the combtooth portion 12a. The flange portion 12c is a brim-form portion protruding inward in the radial direction of the elastic body 12, and is disposed centrally in the thickness direction of the base portion 12b. The vibrating element 11 is fixed to a fixing member 16 by this flange portion 12c.

The piezoelectric body 13 is an electromechanical conversion element that converts electrical energy to mechanical energy. In the present embodiment, the piezoelectric body 13 that is a piezoelectric element is used, but an electrostriction element or the like could be used. The piezoelectric body 13 has a substantially flat plate form and is joined to the elastic body 12 using an adhesive or the like. Unillustrated electrode portions are formed at the piezoelectric body 13 for inputting driving signals.

Wiring of a flexible printed circuit board 14 is connected to the electrode portions of the piezoelectric body 13. The flexible printed circuit board 14 features the function of supplying driving signals to the piezoelectric body 13. The piezoelectric body 13 expands and contracts in accordance with the driving signals supplied from the flexible printed circuit board 14, and thus the elastic body 12 is oscillated and progressive waves are generated at the driving surface of the elastic body 12. In the present embodiment, four progressive waves are generated.

The moving element 15 is a member that is driven to rotate by the progressive waves generated at the driving surface of the elastic body 12. The moving element 15 is a substantially circular discoid member formed of a light metal such as aluminum or the like, and includes a contact surface 15a that contacts the vibrating element 11 (i.e., the driving surface 12d of the elastic body 12). The contact surface 15a has a substantially annular shape. The surface of the contact surface 15a is subjected to a surface treatment such as anodization or the like in order to improve endurance. The output shaft 18 is a substantially circular rod-form member. The output shaft 18 is provided with one end portion thereof contacting the moving element 15, via a rubber member 23, so as to rotate integrally with the moving element 15.

The rubber member 23 is a substantially annular member formed of rubber. This rubber member 23 has the function of making the moving element 15 and the output shaft 18 integrally rotatable, with viscoelasticity due to the rubber, and the function of absorbing vibrations at the vibrations are not, transmitted from the moving element 15 to the output shaft 18. Butyl rubber, silicon rubber, propylene rubber or the like is used for the rubber member 23.

The pressing member 19 is a member that generates a pressure force that is in pressure contact with the vibrating element 11 and the moving element 15 together. The pressing member 19 is provided between the gear 4 and a bearing holding member 21. In the present embodiment the pressing member 19 employs a compression coil spring, but this is not to be a limitation.

The gear 4 is slid on so as to fit onto a D-cut of the output shaft 18, is fixed by a stopper 22 such as an E-ring or the like, and is provided so as to be integral with the output shaft 18 in the rotation direction and the axial direction. The gear 4 transmits driving force to the gear 5 (see FIG. 1) by rotating along with rotation of the output shaft 18.

A structure is formed in which the bearing holding member 21 is disposed at the inner diametric side of a bearing 17 and the bearing 17 is disposed at the inner diametric side of the fixing member 16. The pressing member 19 presses the vibrating element 11 toward the moving element 15 in the axial direction of the output shaft 18. The moving element 15 is in pressure contact with the driving surface of the vibrating element 11 by this pressing force, and is rotatingly driven. A pressure regulation washer may be provided between the pressing member 19 and the bearing holding member 21, at a suitable pressure force for driving of the ultrasonic motor 10 is obtained.

Next, the vibrating element 11 of the present embodiment is described in detail. FIG. 4 is a diagram illustrating the vibrating element 11. FIG. 4A is a diagram in which the vibrating element 11 is seen from the moving element 15 side thereof. FIG. 4B is a cross-sectional diagram of the vibrating element 11 cut along the cross-section of arrows S1-S2, parallel to the XZ plane. FIG. 4C is a cross-sectional diagram of the vibrating element 11 cut along the cross-section of arrows S3-S4, parallel to the XZ plane. The shape illustrated by broken lines in FIG. 4A is the shape in which the contact surface 15a of the moving element 15 contacting the driving surface 12d. The contact surface 15a contacting the driving surface 12d in the region shown by these broken lines. As illustrated, in the present embodiment, the vibrating element 11 includes the elastic body 12 and the piezoelectric body 13 and the profile is elliptical.

The profile of the vibrating element 11 has this elliptical shape for the following reason. In the case of the present invention, as illustrated in FIG. 2, the ultrasonic motor 10 is disposed in the annular gap between the cam tube 6 and the casing 9. If the profile of the vibrating element 11 were circular rather than elliptical, the diametric size thereof would be limited by the width between the cam tube 6 and the casing 9. In consequence, the electrostatic capacity of the piezoelectric body would also be limited.

However, when a piezoelectric body is made elliptical, the electrostatic capacity increases in association with an increase in the major axis. This is because, if conditions such as thickness, permittivity and the like are constant, the electrostatic capacity of the piezoelectric body is proportional to the area of a region in which the piezoelectric body is polarized. Therefore, the polarized region may be made larger by making the area of the piezoelectric body larger. That is, if the area of the contact surface between the piezoelectric body and the elastic body is made larger, the region at which the piezoelectric body is polarized may be made larger, and the electrostatic capacity of the piezoelectric body may be increased. Thus, the reason is because a larger driving force is obtained.

Thus, according to the present embodiment, because the vibrating element 11 (the piezoelectric body 13) is elliptical, the vibrating element 11 may be disposed in a location in which plentiful space cannot be taken in one direction (the Y direction in the present embodiment) such as, for example, the annular space between the cam tube 6 and the casing 9, and this space may be utilized to provide maximum torque.

Figure 5A:
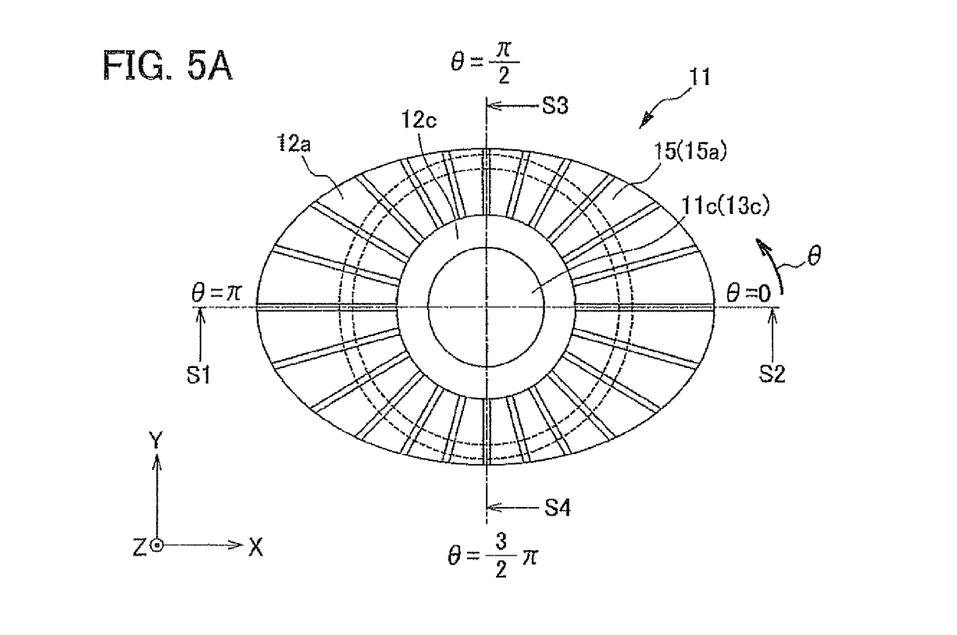
FIG. 5A is a diagram illustrating a vibrating element of a comparative embodiment with FIG. 4A.
Figure 5B:
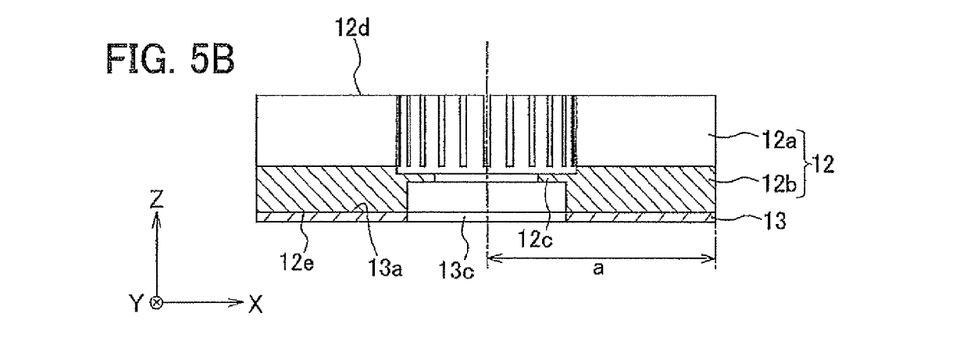
FIG. 5B is a diagram illustrating a vibrating element of a comparative embodiment with FIG. 4B.
Figure 5C:
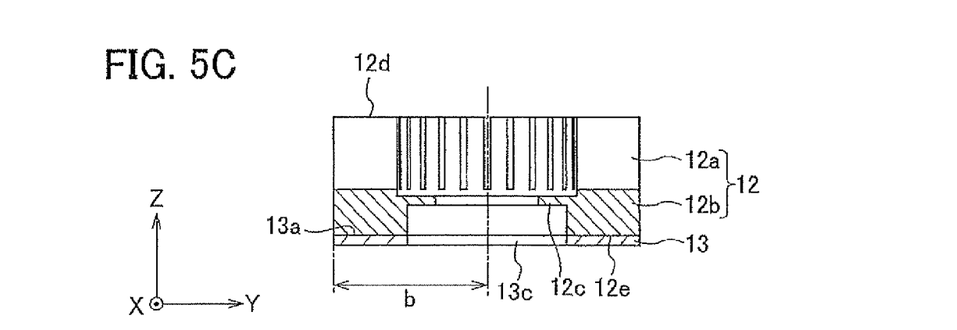
FIG. 5C is a diagram illustrating a vibrating element of a comparative embodiment with FIG. 4C.

However, when the shape of the vibrating element 11 (the piezoelectric body 13 and the elastic body 12) is a shape other than a circle, such as an elliptical shape, in the case of the comparative embodiment illustrated in FIG. 5, the diametric direction width of the elastic body 12 at the major axis "a" is larger, so flexural rigidity is higher than at the minor axis "b". That is, the flexural rigidity varies in the direction of movement θ of the moving body, and vibration amplitudes may not be generated uniformly in the movement direction θ of the moving element 15.

Figure 6A:
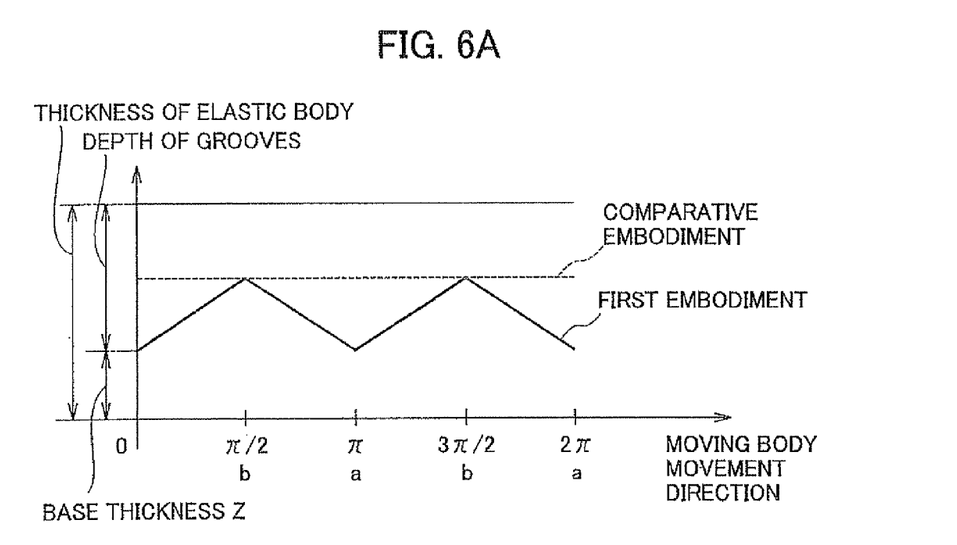
FIG. 6A is a graph in which the horizontal axis is the direction of progress θ in the moving body and the vertical axis is the depth of grooves.

Accordingly, in the present embodiment, as illustrated in FIG. 4B and FIG. 4C, the depths of the grooves 30 in the combtooth portion 12a are made non-uniform. That is, the grooves 30 at the major axis "a" are deeper and the grooves 30 at the minor axis "b" are shallower. FIG. 6A is a graph in which the horizontal axis is the direction of progress θ in the moving body (θ=0 at a position at which the diameter is a) and the vertical axis is the depth of the grooves (i.e., the thickness of the base). The solid line in the drawing represents the present embodiment illustrated in FIG. 4, and the dotted line represents the comparative embodiment illustrated in FIG. 5.

Figure 6B:
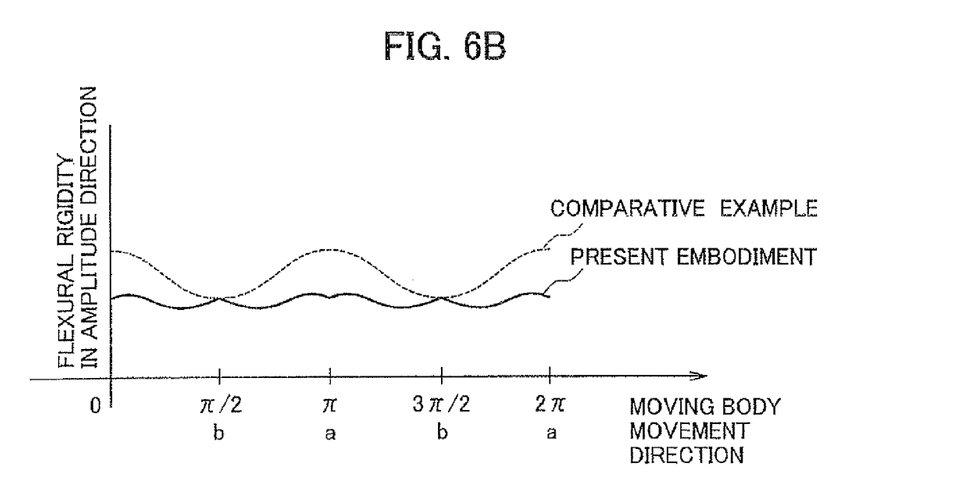
FIG. 6B is a graph in which the horizontal axis is the direction of progress θ in the moving body and the vertical axis is the flexural rigidity.

FIG. 6B is a graph in which the horizontal axis is the direction of progress θ in the moving body (θ=0 at a position at which the diameter is a) and the vertical axis is the flexural rigidity. In FIG. 6B, similarly, the solid line in the drawing represents the present embodiment illustrated in FIG. 4 and the dotted line represents the comparative embodiment illustrated in FIG. 5. As illustrated, in the comparative embodiment, the flexural rigidity is low in vicinities of the minor axis "b" (θ=π/2, 3π/2) and the flexural rigidity is high in vicinities of the major axis "a" (θ=0, π, 2π).

In contrast, in the present embodiment, as shown by the solid line in FIG. 6A, the grooves 30 are deeper (and the base portion 12b is thinner) in the vicinities of the major axis "a" (θ=0, π, 2π) than in the vicinities of the minor axis "b" (θ=π/2, 3π/2). Therefore, at the major axis "a", the width in the radial direction is large but the grooves 30 are deep, while at the minor axis "b", the width in the radial direction is small but the grooves 30 are shallow. Thus, effects on rigidity of the radial direction widths and the depths of the grooves 30 counteract one another, and variations in rigidity between the major axis "a" side and the minor axis "b" side are smaller than in the comparative embodiment, as illustrated by the solid line in FIG. 6B.

The present embodiment described above has the following effects.

(1) Because the vibrating element 11 (the piezoelectric body 13) is elliptical, the vibrating element 11 may be disposed in a location in which plentiful space cannot be taken in one direction (the Y direction in the present embodiment), and this space may be utilized to provide maximum torque.

(2) At the major axis "a", the width in the radial direction is large but the grooves 30 are deep, while at the minor axis "b", the width in the radial direction is small but the grooves 30 are shallow. Therefore, the effects on rigidity of the radial direction widths and the depths of the grooves 30 counteract one another, and differences in rigidity between the major axis "a" side and the minor axis "b" side are made small. Therefore, an ultrasonic motor that can be disposed even in limited space and that has excellent driving characteristics, and a lens barrel and camera provided therewith, may be provided.

VARIANT EXAMPLES

The above exemplary embodiment is not to be limiting; numerous modifications and alterations are possible.

Figure 7:
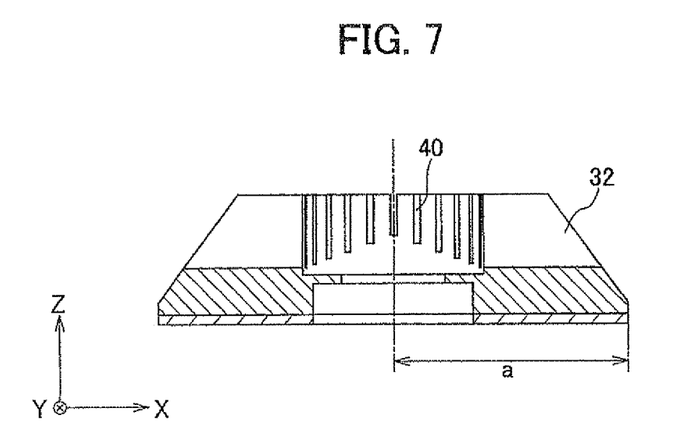
FIG. 7 is a diagram illustrating a vibrating element of a variant example.

(1) In the embodiment described above, the profile of the elastic body 12 is an elliptical columnar shape. However, the present invention is not to be limited thus. As illustrated in FIG. 7, the profile of an elastic body 32 may be a shape in which the peak of an elliptical cone is truncated. In this case, similarly to the above-described embodiment, the rigidity is higher at the major axis "a". However, because the edge portion at the upper end is absent, the difference in rigidity from the minor axis is smaller than in the exemplary embodiment. Therefore, a difference in the depths of grooves 40 between the major axis "a" side and the minor axis side may be smaller than in the exemplary embodiment:

(2) In the embodiment described above, a mode is described in which the effect of the diameters on the rigidity is counteracted by the depths of the grooves. However, the effect of the diameters on the rigidity may be counteracted by a material characteristic of the elastic body. For example, a material may be used at the major axis that has a smaller Young's modulus than a material at the minor axis. When this is done, even with an elliptical elastic body, the rigidity may be made uniform similarly to the embodiment described above.

(3) In the embodiment described above, a mode is described in which the effect of the diameters on the rigidity is counteracted by the depths of the grooves. However, the effect of the diameters on the rigidity may be counteracted by density of the elastic body. For example, a body may be used in which the density at the major axis is smaller than at the minor axis. When this is done, even with an elliptical elastic body, the rigidity may be made uniform similarly to the embodiment described above.

(4) In the embodiment described above, an example in which the profile of the piezoelectric body 13 and elastic body 12 is elliptical is illustrated, but this is not to be limiting. For example, it may be a polygonal shape, and the groove depths, material properties or the like may be altered to suit the shape.

(5) In each embodiment, descriptions are given with the ultrasonic motor in which the moving element is rotatingly driven as an example, but this is not to be limiting. Application is also possible to a linear-type vibration actuator in which a moving element is driven in a linear direction.

(6) In each embodiment, descriptions are given with the ultrasonic motor that uses vibrations in the ultrasonic range as an example, but this is not to be limiting. For example, application is also possible to a vibration actuator that uses vibrations outside the ultrasonic range.

(7) In each embodiment, an example is illustrated in which the ultrasonic motor is used for driving a lens during focusing operations, but this is not to be limiting. For example, it may be an ultrasonic motor that is used for driving during zoom operations of a lens.

(8) In each embodiment, an example is illustrated in which the ultrasonic motor is used in a camera, but this is not to be limiting. For example, it may be used in a driving unit of a photocopier, a steering wheel tilting device or a headrest driving unit in a car, or the like.

The respective embodiment and variant examples may be suitably combined and used, but detailed descriptions are not given herein. The present invention is not to be limited by each embodiment described hereabove.

What is claimed is:

1. A vibration actuator comprising:
an elastic body that is provided contacting an electromechanical conversion element and generates vibration waves in accordance with driving of the electromechanical conversion element; and
a relative movement member that is in pressure contact with the elastic body and is relatively moved with respect to the elastic body by the vibration waves,
wherein:
a plurality of grooves are formed at the relative movement member side of the elastic body,
depths of the grooves in a direction orthogonal to a relative movement direction of the relative movement member vary along the relative movement direction of the relative movement member, and
a width of the elastic member in a direction orthogonal to the relative movement direction of the relative movement member varies along the relative movement direction of the relative movement member.

2. A vibration actuator comprising:
an elastic body that is provided contacting an electromechanical conversion element and generates vibration waves in accordance with driving of the electromechanical conversion element; and
a relative movement member that is in pressure contact with the elastic body and is relatively moved with respect to the elastic body by the vibration waves,
wherein:
the elastic body has a toothcomb portion provided at the relative movement member side and a base portion provided at the electromechanical conversion element side,
thickness of the base portion in a direction orthogonal to a relative movement direction of the relative movement member varies along the relative movement direction of the relative movement member, and
a width of the elastic member in a direction orthogonal to the relative movement direction of the relative movement member varies along the relative movement direction of the relative movement member.

3. A vibration actuator comprising:
an elastic body that is provided contacting an electromechanical conversion element and generates vibration waves in accordance with driving of the electromechanical conversion element; and
a relative movement member that is in pressure contact with the elastic body and is relatively moved with respect to the elastic body by the vibration waves,
wherein:
the Young's modulus of the elastic body varies along a relative movement direction of the relative movement member, and
a width of the elastic member in a direction orthogonal to the relative movement direction of the relative movement member varies along the relative movement direction of the relative movement member.

4. A vibration actuator comprising:
an elastic body that is provided contacting an electromechanical conversion element and generates vibration waves in accordance with driving of the electromechanical conversion element; and
a relative movement member that is in pressure contact with the elastic body and is relatively moved with respect to the elastic body by the vibration waves,
wherein:
density of the elastic body varies along a relative movement direction of the relative movement member, and
a width of the elastic member in a direction orthogonal to the relative movement direction of the relative movement member varies along the relative movement direction of the relative movement member.

5. The vibration actuator according to claim 1,
wherein thickness of the elastic member in a direction orthogonal to the relative movement direction of the relative movement member is constant along the relative movement direction of the relative movement member.

6. The vibration actuator according to claim 2,
wherein thickness of the elastic member in a direction orthogonal to the relative movement direction of the relative movement member is constant along the relative movement direction of the relative movement member.

7. The vibration actuator according to claim 3,
wherein thickness of the elastic member in a direction orthogonal to the relative movement direction of the relative movement member is constant along the relative movement direction of the relative movement member.

8. The vibration actuator according to claim 4,
wherein thickness of the elastic member in a direction orthogonal to the relative movement direction of the relative movement member is constant along the relative movement direction of the relative movement member.

9. The vibration actuator according to claim 1,
wherein a profile of the elastic body is elliptical.

10. The vibration actuator according to claim 2,
wherein a profile of the elastic body is elliptical.

11. The vibration actuator according to claim 3,
wherein a profile of the elastic body is elliptical.

12. The vibration actuator according to claim 4,
wherein a profile of the elastic body is elliptical.

13. A lens barrel provided with a vibration actuator according to claim 1.

14. A camera provided with a vibration actuator according to claim 1.

* * * * *